(12) United States Patent
Vaidyanathan

(10) Patent No.: US 6,839,388 B2
(45) Date of Patent: Jan. 4, 2005

(54) SYSTEM AND METHOD FOR PROVIDING FREQUENCY DOMAIN SYNCHRONIZATION FOR SINGLE CARRIER SIGNALS

(75) Inventor: Krishnamurthy Vaidyanathan, Ossinning, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 743 days.

(21) Appl. No.: 09/766,711

(22) Filed: Jan. 22, 2001

(65) Prior Publication Data

US 2002/0097813 A1 Jul. 25, 2002

(51) Int. Cl.[7] ................... H04L 27/14; H04L 27/16; H04L 27/22
(52) U.S. Cl. .............. 375/326; 375/327; 375/344; 375/362; 375/373; 348/726; 348/735
(58) Field of Search .................. 375/326, 327, 375/328, 344, 362, 376, 373; 348/725, 726, 735, 731

(56) References Cited

U.S. PATENT DOCUMENTS

| | | | | |
|---|---|---|---|---|
| 5,487,186 A | * | 1/1996 | Scarpa | 455/192.2 |
| 5,692,016 A | * | 11/1997 | Vanselow | 375/344 |
| 5,818,544 A | * | 10/1998 | Han | 348/725 |
| 5,828,710 A | | 10/1998 | Beale | 375/344 |
| 5,894,334 A | | 4/1999 | Strolle et al. | 348/725 |
| 5,959,965 A | | 9/1999 | Ohkubo et al. | 370/203 |

FOREIGN PATENT DOCUMENTS

| | | |
|---|---|---|
| EP | 0683576 A1 | 11/1995 |
| EP | 0769873 A1 | 4/1997 |
| EP | 0788225 A1 | 8/1997 |
| EP | 0876031 A2 | 11/1998 |
| WO | 0027066 A2 | 5/2000 |

OTHER PUBLICATIONS

Digital Video Broadcasting (DVB) Framing Structure, Channel Coding and Modulation for Digital Terrestrial Television (DVB–T), ETS 300 744 Mar. 1997, European Telecommunication Standard.

* cited by examiner

Primary Examiner—Phuong Phu

(57) ABSTRACT

There is disclosed an improved system and method for providing frequency domain synchronization for a single carrier signal such as a vestigial sideband signal. The system comprises a synchronization circuit that is capable of obtaining a coarse frequency estimate of the single carrier signal and a fine frequency estimate of the single carrier signal. The system also comprises a three state machine for obtaining an accurate frequency estimate from three separately obtained frequency estimates. The system also comprises a DC estimator circuit that is capable of providing a time domain DC estimate. The system provides a pilot carrier recovery circuit for single carrier signals that has a linear transfer function.

20 Claims, 5 Drawing Sheets

SYSTEM AND METHOD FOR PROVIDING FREQUENCY DOMAIN SYNCHRONIZATION FOR SINGLE CARRIER SIGNALS

TECHNICAL FIELD OF THE INVENTION

The present invention is directed, in general, to the reception of single carrier signals and, more specifically, to an improved system and method for providing frequency domain synchronization for single carrier signals such as vestigial sideband signals.

BACKGROUND OF THE INVENTION

The Advanced Television Systems Committee (ATSC) standard for digital high definition television (HDTV) transmission uses a signal that is modulated as an eight (8) level vestigial sideband (VSB) symbol stream with a rate of 10.76 MHz. The signal is designated as ATSC 8-VSB. The ATSC standard defines a data segment as a length of data having eight hundred thirty two (832) symbols.

Each data segment begins with a fixed pattern comprising the four symbols "1001". The fixed pattern of "1001" indicates the start of a new data segment. The "1001" symbols are the first four symbols of the 832 symbols in the data segment.

In the demodulation process, the fixed pattern "1001" is used by the receiver to determine the positional alignment of the data segment. Locating (or "recovering") the positional alignment of the data segment is essential for data frame synchronization and for facilitating symbol timing recovery. Consequently, reliable and robust detection of the recurring four symbol "1001" pattern is essential to the operation of any receiver that receives signals that are broadcast according to the ATSC standard.

To enable robust data reception in the presence of noise, attenuation, and multipath reflections, a pilot carrier (also referred to as a "tone") is added to the transmitted signal. The pilot carrier is located exactly at DC on the frequency spectrum. The pilot carrier is used in the receiver to precisely estimate the location of the received spectrum. The pilot carrier is also used in the receiver to synchronize a local oscillator in the receiver to the phase and frequency of the transmitter oscillator. The synchronization function is usually carried out in a circuit called the "carrier recovery unit."

Synchronization algorithms are used to synchronize the receiver to the transmitter in three respects. The receiver is synchronized to the transmitter with respect to the instant of sampling and the sample rate. The receiver is also synchronized to the transmitter with respect to the alignment of data frame boundaries. The receiver is also synchronized to the transmitter with respect to the frequency and phase with which the received signal should be demodulated.

A typical carrier recovery unit uses a frequency phased lock loop (FFLP) to recover the pilot carrier. One of the major difficulties with this technique is that it uses non-linear circuits. Non-linear circuits have non-linear transfer functions that are difficult to analyze. In addition, the acquisition loop bandwidth in a frequency phased locked loop has to be narrow in order to obtain good tracking performance.

There is therefore a need in the art for a pilot carrier recovery circuit for single carrier signals that has a linear transfer function.

In order to obtain larger acquisition ranges, there is also a need in the art for a pilot carrier recovery unit for single carrier signals that has an acquisition bandwidth that is independent of tracking bandwidth.

SUMMARY OF THE INVENTION

The present invention generally comprises an improved system and method for providing frequency domain synchronization for single carrier signals such as vestigial sideband signals.

In an advantageous embodiment of the present invention, the improved system of the invention comprises a synchronization circuit that is capable of obtaining a coarse frequency estimate and a fine frequency estimate of a single carrier signal. The system also comprises a three state machine for obtaining an accurate frequency estimate from three separately obtained frequency estimates. The system also comprises a DC estimator circuit that is capable of providing a time domain DC estimate. The system provides a pilot carrier recovery circuit for single carrier signals that has a linear transfer function.

It is a primary object of the present invention to provide an improved system and method for providing frequency domain synchronization for single carrier signals such as vestigial sideband signals.

It is another object of the present invention to provide a coarse frequency estimate and a fine frequency estimate of a single carrier signal.

It is an additional object of the present invention to provide a three state machine for obtaining an accurate frequency estimate from three separate frequency estimates.

It is another object of the present invention to provide a DC estimator circuit that is capable of providing a time domain DC estimate.

The foregoing has outlined rather broadly the features and technical advantages of the present invention so that those skilled in the art may better understand the Detailed Description of the Invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments set forth in this patent document to describe the principles of the improved system and method of the present invention are by way of illustration only and should not be construed in any way to limit the scope of the invention. The improved system and method of the present invention will be described for vestigial sideband signals, a particular type of single carrier signal. The improved system and method of the present invention for providing frequency domain synchronization for single carrier signals will be described for the ATSC 8-VSB signal used in high definition television systems. Those skilled in the art will readily understand that the principles of the present invention may also be successfully applied in other similar devices for providing frequency domain synchronization for other types of single carrier signal.

Figure 1:
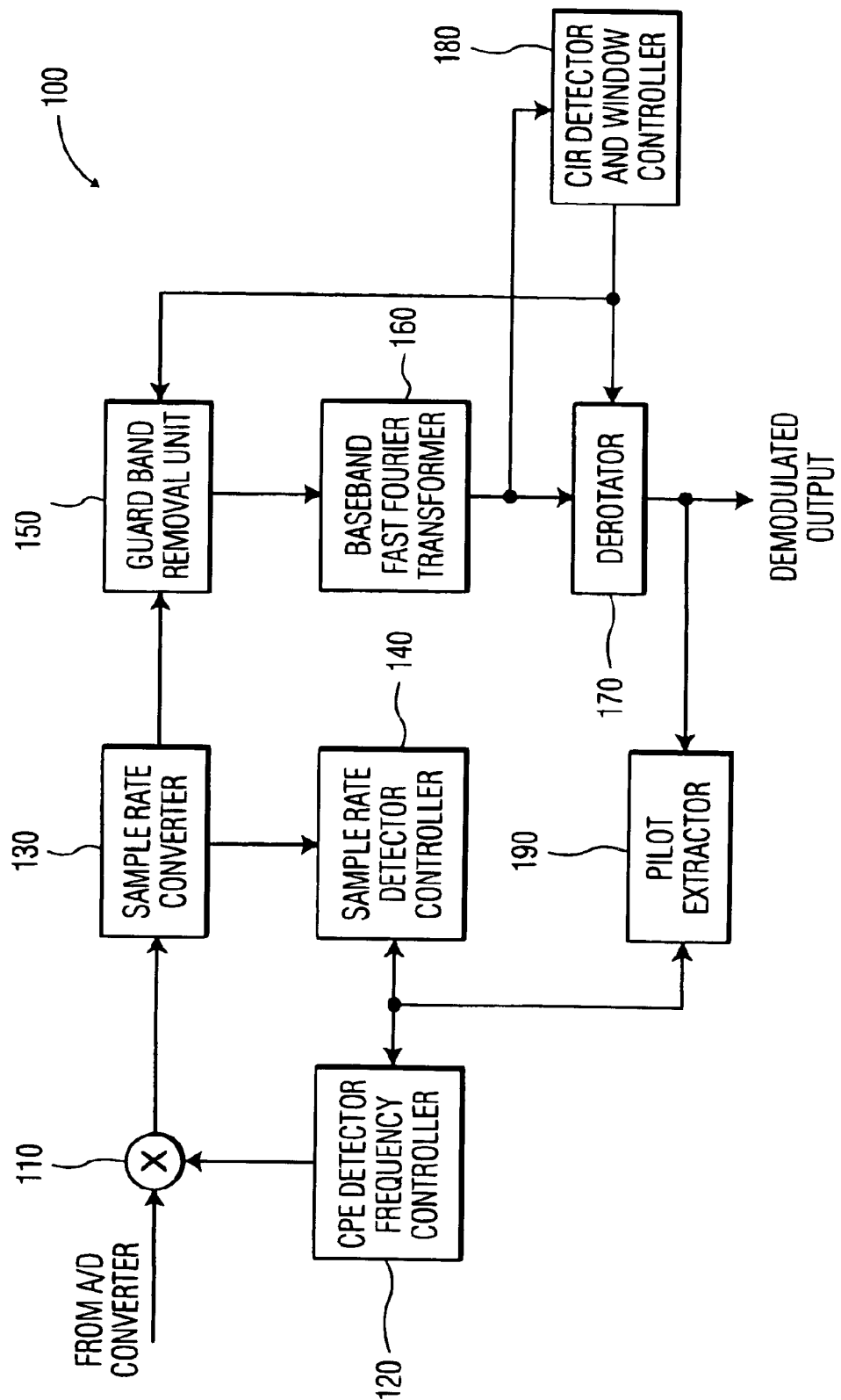
FIG. 1 is a block diagram that illustrates a prior art synchronization loop circuit of a coded orthogonal frequency division multiplex system.

In order to better understand the improved system and method of the present invention, it will be helpful to first consider some synchronization techniques that are used in coded orthogonal frequency division multiplex (COFDM) systems. FIG. 1 is a block diagram that illustrates a prior art synchronization loop circuit 100 for a coded orthogonal frequency division multiplex (COFDM) system. A description of the well known operational principles of synchronization loop circuit 100 may be found in a document entitled "Digital Video Broadcasting, Framing Structure, Channel Coding and Modulation for Digital Terrestrial Television," European Telecommunications Standard Document ETS 300 744, March 1997. Because the operation of COFDM synchronization loop circuit 100 is well known in the art, only a brief description of the circuit will be given here.

Multiplier 110 receives an input signal from a digital to analog converter (not shown). Multiplier 110 also receives an input signal from common phase error (CPE) detector frequency controller 120. The output of multiplier 110 is coupled to sample rate converter 130. A first output of sample rate converter 130 is coupled to sample rate detector controller 140. A second output of sample rate converter 130 is coupled to guard band removal unit 150.

The output of guard band removal unit 150 is coupled to baseband Fast Fourier transformer 160. The output of baseband Fast Fourier transformer 160 is coupled to derotator 170 and channel impulse response (CIR) detector and window controller 180. The output of CIR detector and window controller 180 is coupled to derotator 170 and is also coupled to guard band removal unit 150.

The output of derotator 170 is the demodulated signal output. The demodulated signal output of derotator 170 is also coupled to pilot extractor 190. The output of pilot extractor 190 is coupled to common phase error (CPE) detector frequency controller 120. The output of pilot extractor 190 is also coupled to sample rate detector controller 140.

The synchronization method used by synchronization loop circuit 100 in a COFDM system has a number of interesting features. First, channel impulse response (CIR) detector and window controller 180 determines the power of the received spectrum using a correlation process. This spectral estimate is used to correct the effects of the channel. Channel impulse response (CIR) detector and window controller 180 also uses a maximization algorithm to determine the position of the guard band. This function is essential because the Fast Fourier Transform process that is performed by baseband Fast Fourier Transformer 160 has to be performed on a window aligned to the transmitted data in order to avoid loss of orthogonality. Channel impulse response (CIR) detector and window controller 180 performs the task of frame alignment (i.e., COFDM symbol alignment).

Second, coded orthogonal frequency division multiplexing transmits a number of pilots in every COFDM symbol. Pilot extractor 180 estimates the amplitude and phase of these pilots for every COFDM symbol. All further synchronization steps in the COFDM system depends upon obtaining this information.

Third, in the COFDM system a frequency error of the baseband signal results in a common phase error (CPE) for all of the COFDM carriers after demodulation. Assuming that the phase of the pilots is otherwise random, an average of the pilot phase that is available from pilot extractor 190 should give the common phase error (CPE). The frequency error can be estimated from the common phase error (CPE). The frequency error is then used to correct the modulating frequency.

Fourth, a sampling rate error of the baseband signal results in a carrier phase that is proportional to the carrier frequency. The error in the sample rate can be estimated by using the differential of the phase estimates for adjacent pilots. An average of this estimate is fed back to sample rate converter 130 to correct the sampling rate.

The features of the synchronization method of the COFDM system mentioned above illustrate one particular approach to the problem of achieving synchronization. In reviewing the synchronization techniques employed in the COFDM system, it is noted that some of the COFDM synchronization techniques roughly correspond to some of the synchronization techniques employed in vestigial sideband (VSB) synchronization. In particular, the process of pilot extraction in the COFDM system corresponds to the process of estimating the amplitude and phase of the Fast Fourier Transform (FFT) bin aligned to the vestigial sideband (VSB) edge. While the VSB signal has a single carrier, the COFDM signal has multiple carriers (2 k or 8 k). Therefore, the COFDM signal has a substantial amount of carrier diversity. This means that although a frequency selective channel could fade a small subset of COFDM pilots, it would not fade them all.

In a vestigial sideband (VSB) system, if a fade corresponds to the location of the pilot, then the location of the pilot would be irretrievably lost and the VSB edge pilot extractor could not provide reliable information. In the improved system and method of the present invention, it is assumed that the pilot is present in the spectrum.

There is no guard band in the VSB system. Therefore, the COFDM problem of estimating window position does not arise. This means that the channel impulse response (CIR) estimate is not required in a VSB system.

Data frame synchronization in the VSB system is also quite different than data frame synchronization in a COFDM system. In the VSB system a field synchronization pattern is sent once in every three hundred thirteen (313) segments. The segment synchronization pattern of four symbols (i.e., "1001") indicates the start of a new data segment. The "1001" symbols are the first four symbols of the 832 symbols in the data segment. The four bytes for the "1001" symbols are a very small fraction of the Fast Fourier Transform (FFT) size (usually on the order of one thousand (1 k) bytes). This means that the Fast Fourier Transform (FFT) output can not be used for data frame synchronization.

To further investigate frequency domain synchronization for VSB signals, an analysis of a mathematical model of a VSB signal is useful. A baseband vestigial sideband (VSB) signal is an amplitude modulated (AM) waveform with a small direct current (DC) component that is to be used as the pilot. The amplitude of the pilot is denoted $A_p$. For the purpose of studying the synchronization problem, the transmitted signal, $x_p$, may be modeled as:

$$x_p(n) = A_p \exp(j2\pi f_p t) \tag{1}$$

where $f_p$ is the pilot frequency and t is time. At the receiver a down conversion is performed by the tuner to bring the signal back to baseband by beating the received signal with a frequency $f_p + \Delta f_p$, where $\Delta f_p$ is a frequency error. In practice, the value $\Delta f_p$ is random and is a function of time. For the present analysis, however, assume that the frequency error $\Delta f_p$ is a constant. The baseband received signal with constant frequency error $\Delta f_p$ is denoted as $x_{pr}(t)$.

$$x_{pr}(t) = A_p \exp(j2\pi(f_p)t)\exp(-j2\pi(f_p+\Delta f_p)t) \tag{2}$$

$$x_{pr}(t) = A_p \exp(-j2\pi(\Delta f_p)t) \tag{3}$$

After digitizing, this becomes:

$$x_{pr}(k) = A_p \exp(-j2\pi(\Delta f_p)k(T_s+\Delta T_s)) \tag{4}$$

Taking the Fourier transform of Equation (4) and looking only at the phase of the pilot in the $m^{th}$ bin, the result is:

$$\mathrm{Arg}(X_{pr}(m)) = \mathrm{Arg}[\Sigma(A)(B)] \tag{5}$$

where the summation is from k=0 to k=N−1 and where $$A = A_p \exp(-j2\pi(\Delta f_p)k\, T_s(1+(\Delta T_s/T_s))) \tag{6}$$

and $$B = \exp(-j(2\pi/N)m\, k(1+(\Delta T_s/T_s))) \tag{7}$$

It is noted that the discrete Fourier transform is related to the continuous Fourier transform by substituting $kT_s$ for t and $f_s/N$ for the frequency spacing, which cancel out only for constant $T_s$. In the given case, $T_s$ is instantaneously changing.

Equation (5) gives the result:

$$\mathrm{Arg}(X_{pr}(m)) = \Phi(\Delta f_p(1+(\Delta T_s/T_s))) + \Phi(m(1+(\Delta T_s/T_s))) \tag{8}$$

Now let the received sample index k=qN+n. This represents the $n^{th}$ sample in the $q^{th}$ discrete Fourier transform (DFT) frame denoted by $X_{pr,q}$. This gives:

$$\mathrm{Arg}[X_{pr,q}(m)/X_{pr,q+1}(m)] = \mathrm{Arg}[(C)(D)] \tag{9}$$

where $$C = \exp(j2\pi(\Delta f_p)NT_s(1+(\Delta T_s/T_s))) \tag{10}$$

and $$D = \exp(j(2\pi/N)m(1+(\Delta T_s/T_s))) \tag{11}$$

This gives:

$$\mathrm{Arg}[X_{pr,q}(m)/X_{pr,q+1}(m)] = E+F \tag{12}$$

where $$E = 2\pi(\Delta f_p)NT_s(1+(\Delta T_s/T_s)) \tag{13}$$

and $$F = (2\pi/N)m(1+(\Delta T_s/T_s)) \tag{14}$$

By considering Equation (12), Equation (13), and Equation (14), it is possible to make the following observations:

First, both the carrier frequency and the sample rate error appear as a phase term in the frequency domain. There is therefore a need to decouple the effect of these two quantities. The carrier frequency is a common phase error in all the carriers, while the sample rate error causes a phase error that is proportional to the bin in which the carrier appears. In coded orthogonal frequency division multiplexing (COFDM), there are several carriers. Therefore Equation (12) (and its constitutive equations (13) and (14)) may be solved for several pairs of m. This will eliminate the first term and isolate the second term. It is noted that the average slope of Equation (12) with respect to m yields the sample rate error. For the vestigial sideband (VSB) case, however, the only carrier is placed at an arbitrary m. Because of this, the coded orthogonal frequency division multiplexing (COFDM) method can not be used for timing recovery.

Second, to get this relation there is a complex division of the Fast Fourier Transform output from one time window by the Fast Fourier Transform output from the next time window. (Recall from complex variable theory that a complex division may be carried out using two real divisions.) The complex division means that the average frequency and timing offset is assumed constant for at least two Fast Fourier Transform windows. This is a common problem in the coded orthogonal frequency division multiplexing (COFDM) front end. This problem means that a better tuner is required. Note that, because we are interested only in the phase, the division operator may be replaced by a multiplication of the terms $X_{pr,q}(m)$ and $X^*_{pr,q+1}(m)$ where $X^*$ denotes the complex conjugate of X.

Third, if it is assumed that the timing recovery is performed before the Fast Fourier Transform, then $\Delta T_s$ is much less than $T_s$. This means that the phase of the $m^{th}$ bin contains only the component due to carrier offset. In general, this is a reasonable assumption because the receiver first derives timing, then the carrier phase before adapting the equalizer.

Frequency estimation in a COFDM system is divided into two portions. The first portion is a coarse frequency estimation in which the estimate is determined to be within plus or minus one half Fast Fourier Transform (FFT) bin spacing. The second portion is a fine frequency estimation in which the estimate is determined to be less than one Hertz (1 Hz) error.

The coarse frequency estimation procedure uses a mask for the continual pilot carriers after differential demodulation, and then maximizes the power over the position of the mask. The input signal is now translated in frequency to align the pilot positions with the transmitter. Now the frequency offset may be assumed to be less than one half bin spacing.

The fine frequency error is then estimated by averaging the differentially demodulated signal over the continual pilots. A more accurate estimate may also be obtained by using the scattered pilots.

The COFDM frequency estimation method described above can not be used for single carrier systems because the COFDM method uses information from multiple carriers.

As will be more fully described, the system and method of the present invention comprises algorithms for frequency estimation in single carrier systems. As previously mentioned, although the system and method of the present invention will be described with respect to a vestigial sideband (VSB) system, it is generally applicable to single carrier systems.

Although there is only one carrier in a VSB system, the VSB spectrum may be interpreted as follows. The VSB pilot carrier is an impulse (in the frequency domain) with a constant phase advance from symbol to symbol. The entire VSB spectrum can be considered to be a set of data carriers with random phase variations from symbol to symbol with the pilot carrier superimposed on them. Therefore, the average power spectrum will boost the pilot carrier with respect to the data carriers.

This means that a coarse frequency estimate may be obtained by a peak picking operation on the average power spectrum. After the bin in which the pilot carrier has been located, a fine frequency estimate may be obtained by using Equation (12). This method will be referred to as the first frequency estimation algorithm."

Figure 2:
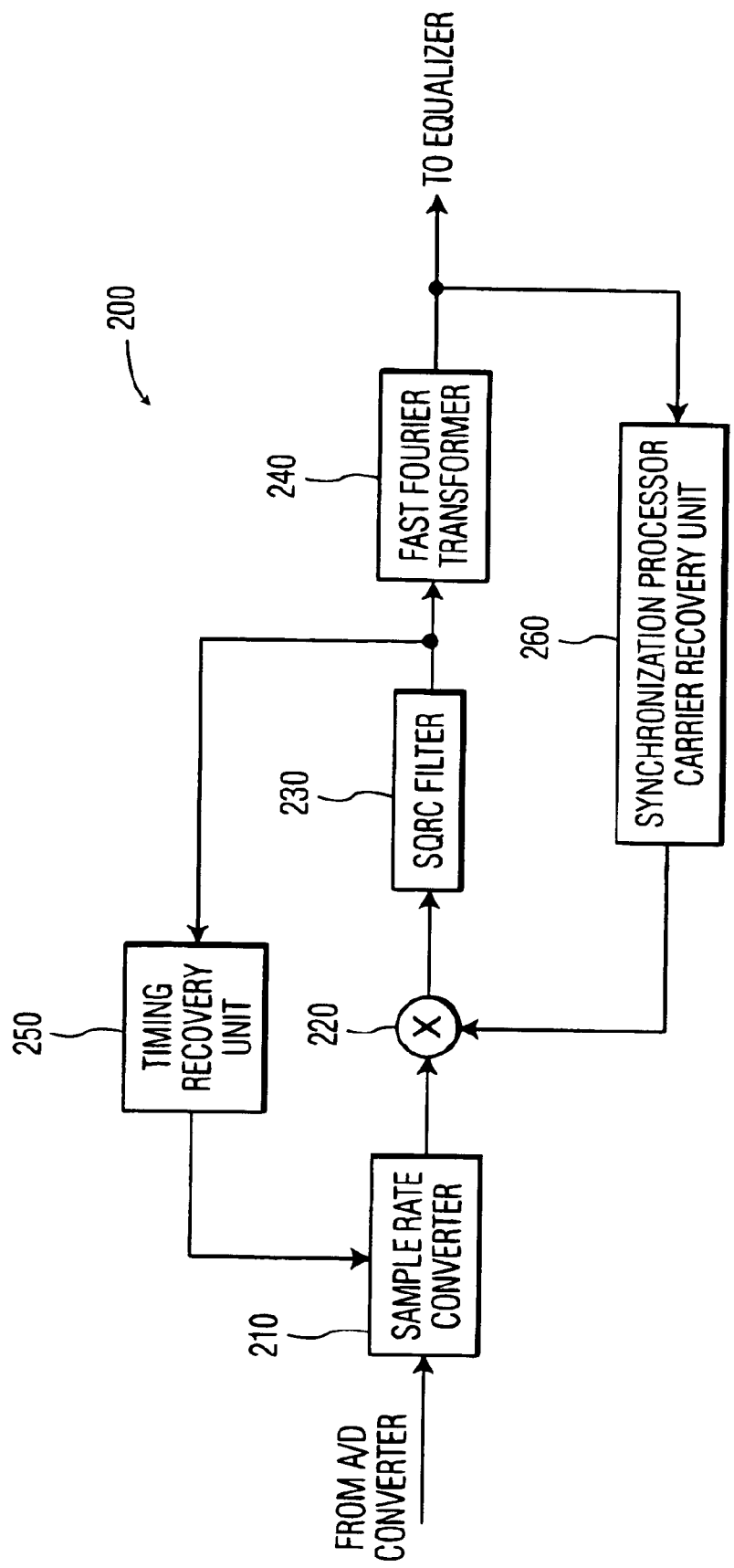
FIG. 2 is a block diagram that illustrates an advantageous embodiment of the present invention for providing frequency domain carrier and timing recovery for single carrier signals such as vestigial sideband signals.

FIG. 2 is a block diagram that illustrates an advantageous embodiment of the present invention for providing frequency domain carrier and timing recovery for single carrier signals such as vestigial sideband signals. The first element of synchronization circuit 200 of the present invention is sample rate converter 210. Sample rate converter 210 receives an input signal from a digital to analog converter (not shown). The output of sample rate converter 210 is coupled to multiplier 220. Multiplier 220 also receives an input signal from synchronization processor carrier recovery unit 260.

The output of multiplier 220 is coupled to square root raised cosine (SQRC) filter 230. The SQRC filter is used to match a similar filter in the transmitter (not shown). The output of SQRC filter 230 is coupled to Fast Fourier transformer 240. The output of Fast Fourier Transformer 240 is coupled to an equalizer (not shown). The output of Fast Fourier Transformer 240 is also coupled to synchronization processor carrier recovery unit 260. The output of Fast Fourier Transformer 240 provides a spectral estimate of the received data.

The output of square root raised cosine (SQRC) filter 230 is also coupled to timing recovery unit 250. The output of timing recovery unit 250 is coupled to sample rate converter 210. The timing recovery performed in timing recovery unit 250 may be either pilot assisted or blind. The timing recovery is performed in the time domain.

When the above described first frequency estimation algorithm was used in synchronization circuit 200, two problems were noticed. First, the frequency estimation procedure using the Fast Fourier Transformer (FFT) has an inherent problem when the frequency offset coincides with the half bin spacing due to the leakage effect. Second, if the frequency offset is negative, the pilot carrier suffers a larger attenuation from the square root raised cosine (SQRC) filter because it is now in the stop-band of the filter. This means that the average power in the data carrier can be larger than the average power in the pilot carrier for low time constants. This would give a erroneous coarse frequency estimate.

The second problem (i.e, negative frequency offset) may be solved by providing an initial positive frequency offset to the input signal. After the frequency estimation procedure is completed, then the initial positive frequency offset is removed.

The first problem (i.e., frequency offset coincides with half bin spacing) may be solved by providing a state machine with three states. In the first state of the state machine, a frequency estimate is obtained in the manner previously described. In the second state of the state machine, a second estimate is obtained with a known fixed frequency estimate of a positive one fourth (+¼) bin spacing. In the third state of the state machine, a third estimate is obtained with a known fixed frequency estimate of a negative one fourth (−¼) bin spacing.

Symmetric differences of the three estimates are then calculated to determine the two closest estimates. The frequency offset is taken to be the average of the two closest estimates plus one fourth of a bin spacing. This method will be referred to as the "second frequency estimation algorithm."

Figure 3:
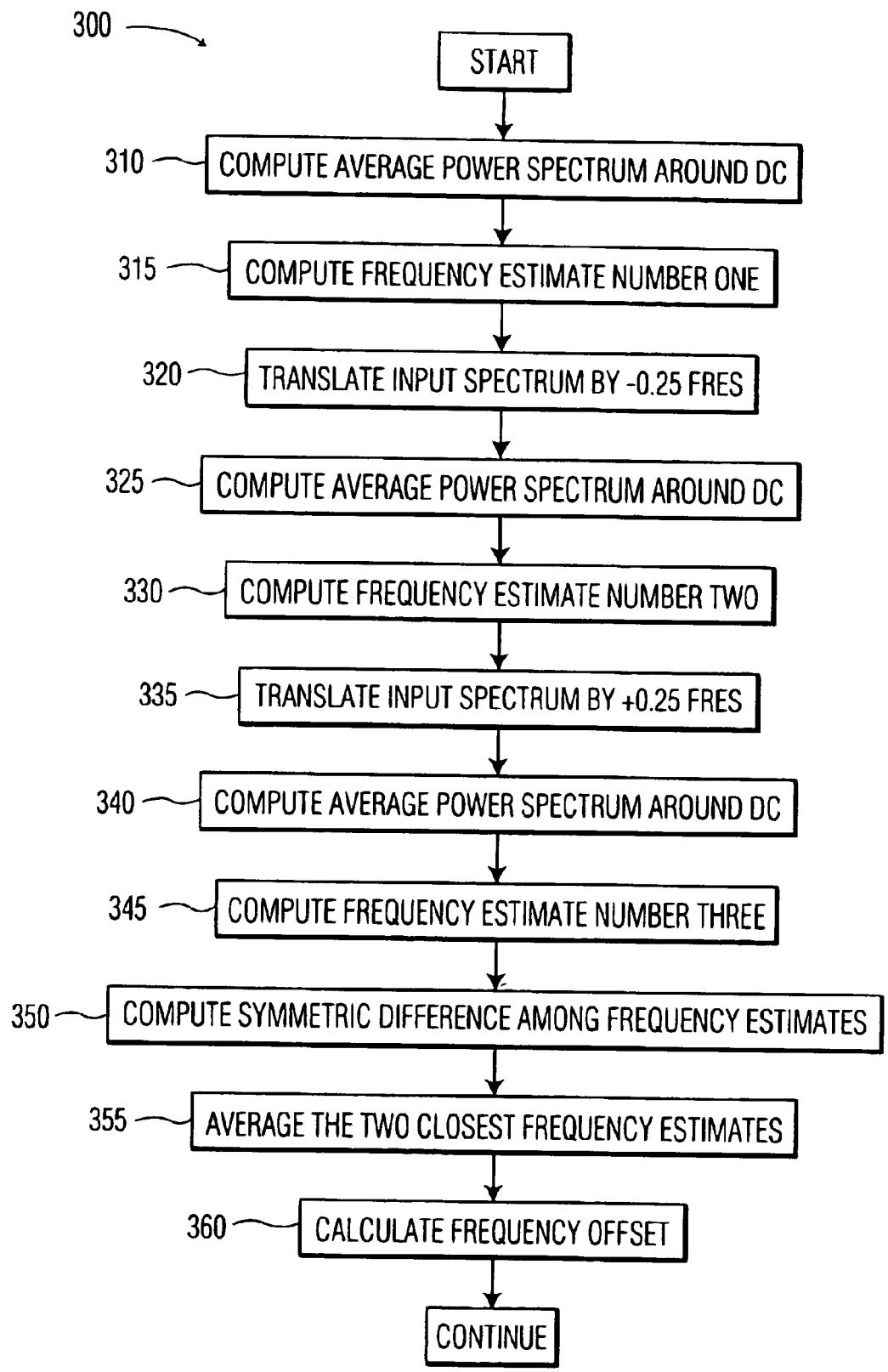
FIG. 3 is a flow chart diagram illustrating a first portion of an advantageous method of operation of the improved system of the present invention.

FIG. 3 is a flow chart diagram illustrating the method of operation of the second frequency estimation algorithm. The steps of the method are generally denoted with reference numeral 300. First the average power spectrum around DC is computed (step 310). Then frequency estimate number one is computed (step 315).

Then a positive one fourth (+¼) bin spacing is provided by translating the input spectrum by an amount equal to minus one fourth (−0.25) times FRES (step 320). FRES is equal to the sampling frequency divided by the Fast Fourier Transformer (FFT) bin size. Then the average power spectrum around DC is computed (step 325). Then frequency estimate number two is computed (step 330).

Then a negative one fourth (−¼) bin spacing is provided by translating the input spectrum by an amount equal to positive one fourth (+0.25) times FRES (step 335). Then the average power spectrum around DC is computed (step 340). Then frequency estimate number three is computed (step 345).

Next the symmetric differences of the three estimates are computed to determine the two closest estimates (step 350). The two closest estimates are then averaged (step 355). Lastly, the frequency offset is calculated by adding to the average of the two closest estimates an amount equal to positive one fourth (+0.25) times FRES (step 360).

Figure 4:
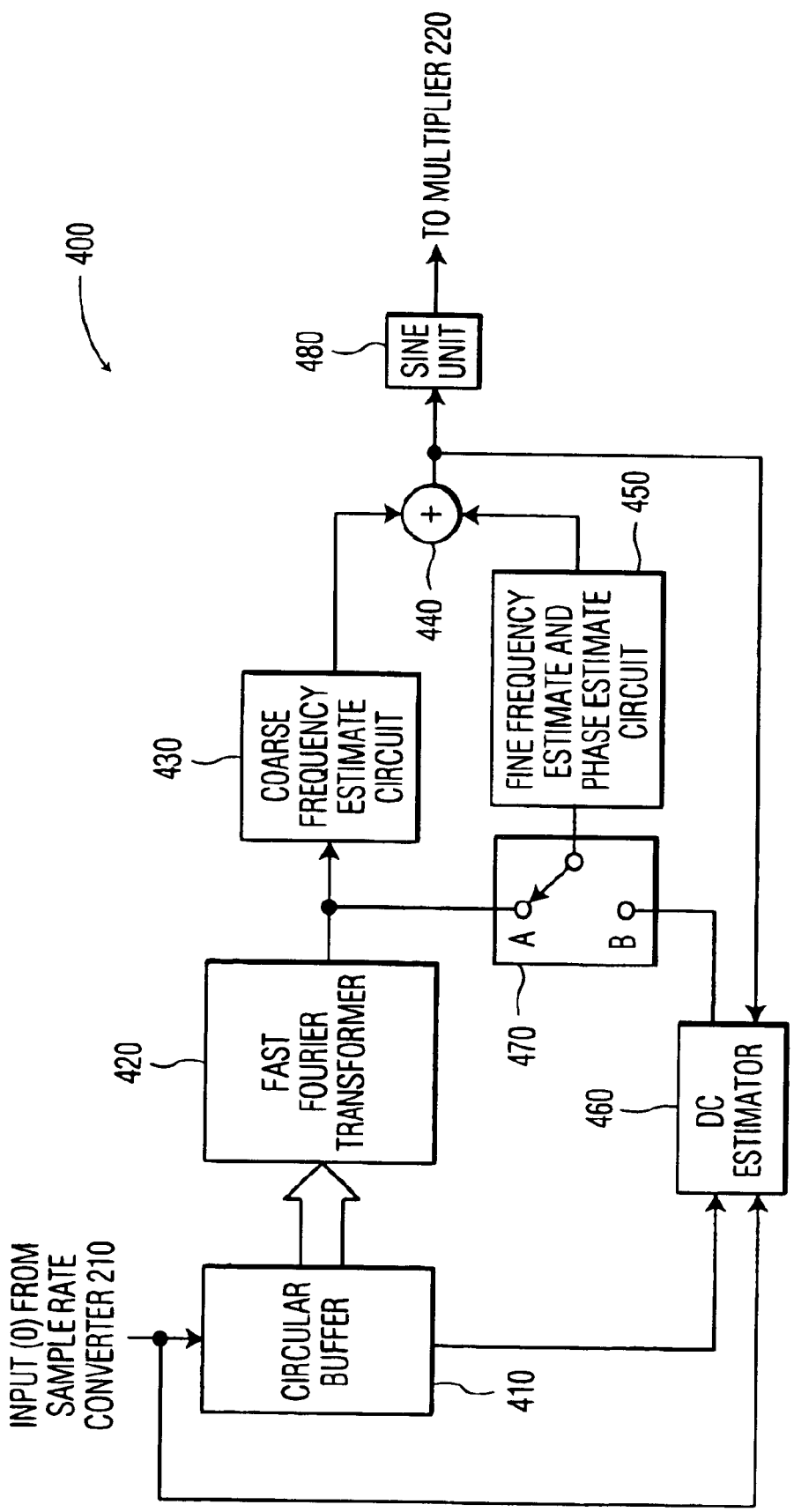
FIG. 4 is a block diagram of alternate advantageous embodiment of the present invention for providing frequency domain carrier and timing recovery for single carrier signals such as vestigial sideband signals.

FIG. 4 illustrates a block diagram of alternate advantageous embodiment of the present invention for providing frequency domain carrier and timing recovery for single carrier signals. The alternate advantageous embodiment comprises circular buffer 410 that is capable of receiving input samples from sample rate converter 210 (not shown in FIG. 4). The advantageous embodiment of the present invention shown in FIG. 4 corresponds to Fast Fourier Transformer 240 and synchronization processor carrier recovery unit 260 of FIG. 2.

Circular buffer 410 is coupled to Fast Fourier Transformer (FFT) 420. The output of Fast Fourier Transformer (FFT) 420 is coupled to coarse frequency estimate circuit 430 and to switch 470. When switch 470 is in the "A" position as shown in FIG. 4, output from Fast Fourier Transformer 420 is provided to fine frequency estimate and phase estimate circuit 450.

Coarse frequency estimate circuit 430 provides a coarse estimate of the frequency and sends the coarse estimate to multiplier 440. Fine frequency estimate and phase estimate circuit 450 provides a fine estimate of the frequency and a phase estimate and sends these estimates to adder 440. Adder 440 combines these estimates and sends them to a sinusoidal multiplier unit 480. Sinusoidal multiplier unit 480 multiplies the combined frequency estimate by a sinusoidal factor of $\exp(-j\theta)$. The value $\theta$ equals the sum of $\omega t$ plus $\phi$ where $\omega$ is angular frequency, t is time, and $\phi$ is phase. The output of sinusoidal multiplier unit 480 is then sent to multiplier 220 (shown in FIG. 2).

FIG. 4 also shows that the alternate advantageous embodiment of the present invention comprises DC estimator circuit 460. DC estimator circuit 460 is coupled to and receives input from circular buffer 410. DC estimator circuit 460 is coupled to and receives input from sample rate converter 210 (not shown in FIG. 4). DC estimator circuit 460 is also coupled to the output of adder 440 and receives input from the output of adder 440.

The alternate advantageous embodiment of the present invention shown in FIG. 4 may be used to obtain a time domain DC estimate instead of using the output provided by the Fast Fourier Transformer 420 to obtain a fine frequency estimate. After the pilot carrier has been shifted to the DC bin, a new time domain DC estimate may be calculated from the equation:

$$DC_{NEW} = FFT(0) - \text{Input}(N) + \text{Input}(0) \tag{15}$$

where FFT (0) is the processed DC estimate, and where Input (N) is the input sample received N time periods earlier, and where Input (0) is the current input sample.

DC estimator circuit 460 receives the value of FFT (0) from multiplier 440. DC estimator circuit 560 receives the value of Input (N) from circular buffer 410. DC estimator circuit 460 receives the value of Input (0) from sample rate converter 210 (not shown in FIG. 4). DC estimator circuit 460 calculates the new time domain DC estimate, $DC_{NEW}$, using Equation (15). The calculation of the new time domain DC estimate may be done as frequently as every sample by removing the oldest sample from circular buffer 410 and replacing it with the new input sample.

When it is desired to use the new time domain DC estimate, switch 470 is set to the B" position of switch 470. Fine frequency estimate and phase estimate circuit 450 then begins to receive the new time domain DC estimate from DC estimator circuit 460 and uses the new time domain DC estimate in its fine frequency estimation process. This technique removes the latency of the Fast Fourier Transformer 420 after the initial acquisition phase.

Figure 5:
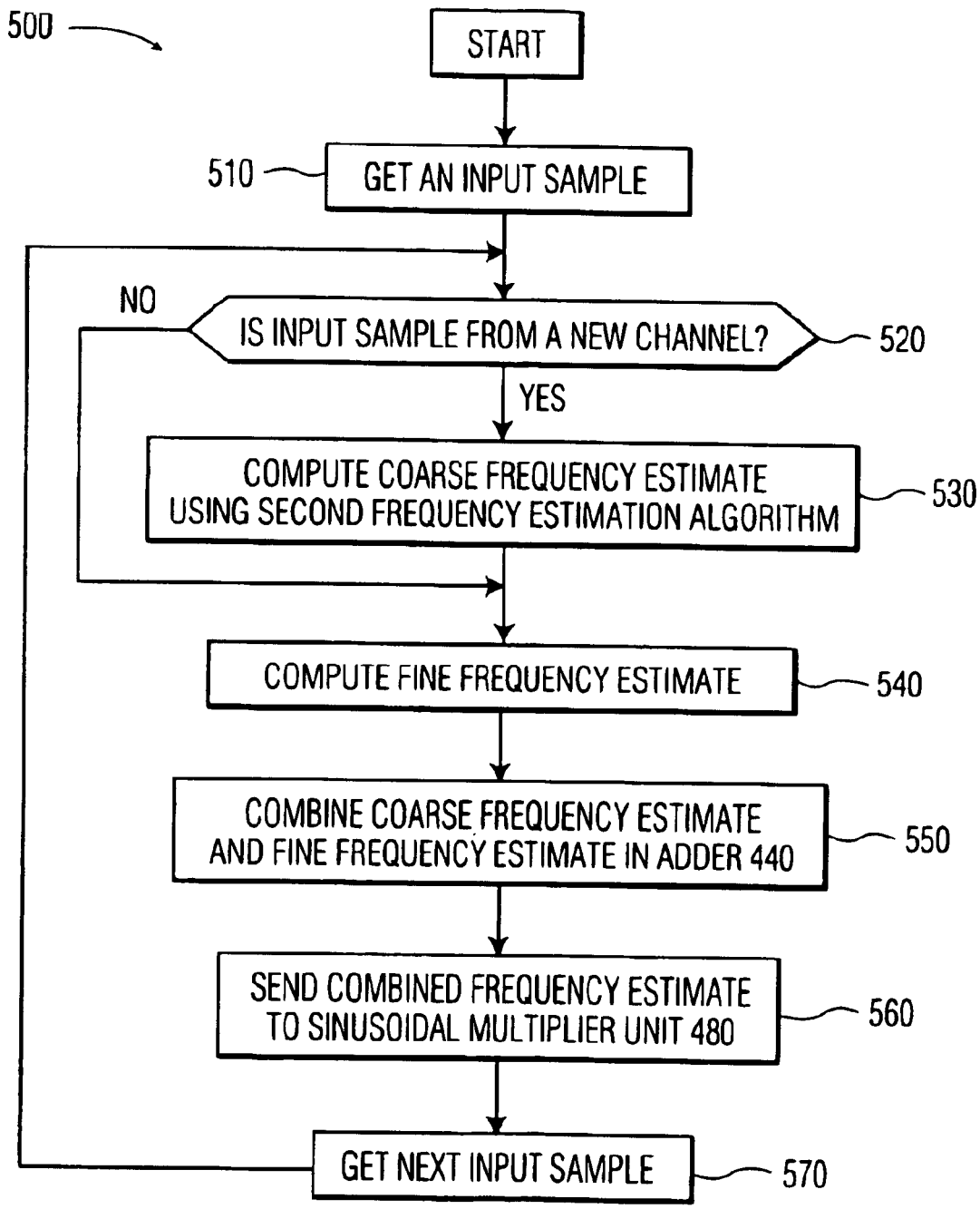
FIG. 5 is a flow chart diagram illustrating a second portion of an advantageous method of operation of the improved system of the present invention.

FIG. 5 is a flow chart diagram illustrating the method of operation of a third frequency estimation algorithm that uses the second frequency estimation algorithm described above. The steps of the method are generally denoted with reference numeral 500. First an input sample is obtained (step 510). Then a determination is made whether the input sample is from a new channel (decision step 520). If the input sample is from a new channel, then a new coarse frequency estimate is computed using the second frequency estimation algorithm (step 530) and control is then passed to step 540. If the input sample is not from a new channel, then a new coarse frequency estimate is not computed. Control then passes around step 530 to step 540. In step 540 a fine frequency estimate is computed and control is then passed to step 550.

After a coarse frequency estimate has been computed (step 530), the carrier frequency is aligned exactly to the DC bin of Fast Fourier Transformer 420. This spectrum is now used in step 540 to compute a fine frequency estimate using Equation (12) with the value of m equal to zero. The value of m equal to zero corresponds to the DC bin.

When m is equal to zero in Equation (14), then F is equal to zero. Therefore Equation (12) becomes:

$$\text{Arg}[X_{pr,q}(0)/X_{pr,q+1}(0)] = E \tag{16}$$

where E equals $2\pi (\Delta f_p) NT_s (1+(\Delta T_s/T_s))$ from Equation (13). Because the quantity $(\Delta T_s/T_s)$ is very much less than one, Equation (15) becomes:

$$\text{Arg}[X_{pr,q}(0)/X_{pr,q+1}(0)] = 2\pi(\Delta f_p)NT_s \tag{17}$$

Therefore the fine frequency estimate, $\Delta f_p$, is:

$$\Delta f_p = [1/(2\pi NT_s)][\text{Arg } [X_{pr,q+1}(0)/X_{pr,q+1}(0)]] \tag{18}$$

With this result we have solved the problem of decoupling the carrier frequency and the sample rate error, while using information from a single carrier.

After a coarse frequency estimate has been computed (step 530) and after a fine frequency estimate has been computed (step 540), then the two estimates are combined in adder 440 (step 550). The combined frequency estimate is then sent to sinusoidal multiplier unit 480 (step 560). Sinusoidal multiplier unit 480 multiplies the combined frequency estimate by a sinusoidal factor of $\exp(-j\theta)$. The value $\theta$ equals the sum of $\omega t$ plus $\phi$ where $\omega$ is angular frequency, t is time, and $\phi$ is phase. The output of sinusoidal multiplier unit 480 is then sent to multiplier 220 (shown in FIG. 2). Then a next sample is obtained (step 570) and control returns to step 520.

In this manner the third frequency estimation algorithm (including a coarse frequency estimate and a fine frequency estimate) provides very good frequency estimation. The peak open loop frequency error in the frequency estimate has been found to be on the order of one Hertz (1 Hz). The frequency estimator of the present invention is linear and does not need to use non-linear methods.

The present invention illustrates that carrier recovery, specifically frequency estimation, is possible for single carrier signals using frequency domain algorithms. It is noted, however, that the system and method of the present invention assumes the presence of the pilot carrier in the received signal. In a frequency selective channel there can be a null at the carrier frequency. In such a case, or in any case in which the pilot carrier is absent, then the system and method of the present invention will not work.

Although the present invention has been described in detail, those skilled in the art should understand that they can make various changes, substitutions and alterations herein without departing from the spirit and scope of the invention in its broadest form.

What is claimed is:

1. A system for providing frequency domain synchronization for a single carrier signal, comprising:

a synchronization circuit that is capable of receiving the single carrier signal, obtaining a coarse frequency estimate of the single carrier signal, and obtaining a fine frequency estimate of the single carrier signal;

wherein said synchronization circuit is capable of obtaining the fine frequency estimate of said single carrier signal using a frequency error $\Delta f_p$ where $\Delta f_p$ is given by the equation:

$$\Delta f_p = [1/(2\pi N T_s)][\text{Arg}[X_{pr,q}(0)/X_{pr,q+1}(0)]]$$

where $[1/(NT_s)]$ is a frequency spacing, and where $T_s$ is a sampling period, and
where $X_{pr}(0)$ is the transmitted signal with constant frequency error in a zeroth bin, and where $\text{Arg}[X_{pr,q}(0)/X_{pr,q+1}(0)]$ is a phase of a pilot carrier signal in the zeroth bin.

2. The system as claimed in claim 1, wherein said single carrier signal is a vestigial sideband signal.

3. The system as claimed in claim 1, wherein said synchronization circuit is capable of obtaining the coarse frequency estimate of said single carrier signal by locating a pilot carrier signal on an average power spectrum of said single carrier signal.

4. A system for providing frequency domain synchronization for a single carrier signal, comprising:
   a synchronization circuit that is capable of receiving the single carrier signal obtaining a coarse frequency estimate of the single carrier signal, and obtaining a fine frequency estimate of the single carrier signal;
   wherein said synchronization circuit comprises a three state machine for obtaining a final frequency estimate of said single carrier signal, said three state machine capable of obtaining a first frequency estimate, obtaining a second frequency estimate with a known fixed frequency estimate of a positive one fourth bin spacing, and obtaining a third frequency estimate with a known fixed frequency estimate of a negative one fourth bin spacing.

5. The system as claimed in claim 4 wherein said three state machine is capable of determining which two of the three frequency estimates are closest in value, and capable of obtaining an average of the two closest frequency estimates, and capable of calculating said final frequency estimate of said single carrier signal by adding one fourth of a bin spacing to said average of the two closest frequency estimates.

6. The system as claimed in claim 4 where said three state machine is capable of obtaining said first, second, and third frequency estimates of the single carrier signal by obtaining a coarse frequency estimate of said single carrier signal by locating a pilot carrier signal on an average power spectrum of said single carrier signal, and by obtaining a fine frequency estimate of said single carrier signal using a frequency error $\Delta f_p$ where $\Delta f_p$ is given by the equation:

$$\Delta f_p = [1/(2\pi N T_s)][\text{Arg}[X_{pr,q}(0)/i\ X_{pr,q+1}(0)]]$$

where $[1/(NT_s)]$ is a frequency spacing, and where $T_s$ is a sampling period, and where $X_{pr}(0)$ is the transmitted signal with constant frequency error in a zeroth bin, and where $\text{Arg}[X_{pr,q}(0)/X_{pr,q+1}(0)]$ is a phase of a pilot carrier signal in the zeroth bin.

7. The system as claimed in claim 6 wherein said synchronization circuit has a linear transfer function.

8. A system for providing frequency domain synchronization for a single carrier signal, said system comprising:
   a synchronization circuit comprising a Fast Fourier Transformer, a coarse frequency estimate circuit coupled to an output of said Fast Fourier Transformer, and a fine frequency estimate and phase estimate circuit coupled to an output of said Fast Fourier Transformer, and
   a DC estimator circuit capable of being coupled to said fine frequency estimate and phase estimate circuit in place of said output of said Fast Fourier Transformer, said DC estimator circuit capable of providing a time domain DC estimate to said fine frequency estimate and phase estimate circuit.

9. The system as claimed in claim 8 wherein said DC estimator circuit calculates said time domain DC estimate, $DC_{NEW}$, from the equation:

$$DC_{NEW} = FFT(0) - \text{Input}(N) + \text{Input}(0)$$

where FFT (0) is a processed DC estimate, and where Input (N) is an input sample received N time periods earlier, and where Input(0) is a current input sample.

10. The system as claimed in claim 9 wherein said DC estimator circuit receives the value of Input (N) from an output of a circular input buffer for said Fast Fourier Transformer, and wherein said DC estimator circuit receives the value of Input (0) from an output of a sample rate converter, and wherein said DC estimator circuit receives the value of FFT(0) from an output of an adder that adds the outputs of said coarse frequency estimate circuit and said fine frequency estimate and phase estimate circuit.

11. A method for providing frequency domain synchronization for a single carrier signal, comprising the steps of:
   receiving a single carrier signal;
   obtaining a coarse frequency estimate of the single carrier signal; and
   obtaining a fine frequency estimate of the single carrier signal;
   wherein said step of obtaining the fine frequency estimate of said single carrier signal comprises the step of calculating said fine frequency estimate using a frequency error $\Delta f_p$ where $\Delta f_p$ is given by the equation:

$$\Delta f_p = [1/(2\pi N T_s)][\text{Arg}[X_{pr,q}(0)/X_{pr,q+1}(0)]]$$

where $[1/(NT_s)]$ is a frequency spacing, and where $T_s$ is a sampling period, and where $X_{pr}(0)$ is the transmitted signal with constant frequency error in a zeroth bin, and where $\text{Arg}[X_{pr,q}(0)/X_{pr,q+1}(0)]$ is a phase of a pilot carrier signal in the zeroth bin.

12. The method as claimed in claim 11, wherein said single carrier signal is a vestigial sideband signal.

13. The method as claimed in claim 11, wherein said step of obtaining the coarse frequency estimate of said single carrier signal comprises the step of:
   locating a pilot carrier signal on an average power spectrum of said single carrier signal.

14. A method for providing frequency domain synchronization for a single carrier signal, comprising the steps of:
   receiving a single carrier signal;
   obtaining a coarse frequency estimate of the single carrier signal;
   obtaining a fine frequency estimate of the single carrier signal;
   obtaining in a three state machine a first frequency estimate of said single carrier signal;
   obtaining in said three state machine a second frequency estimate of said single carrier signal with a known fixed frequency estimate of a positive one fourth bin spacing; and
   obtaining in said three state machine a third frequency estimate of said single carrier signal with a known fixed frequency estimate of a negative one fourth bin spacing.

15. The method as claimed in claim 14 further comprising the steps of:
   determining which two of said three frequency estimates are closest in value;
   obtaining an average of the two closest frequency estimates; and
   calculating a final frequency estimate of said single carrier signal by adding one fourth of a bin spacing to said average of the two closest frequency estimates.

16. The method as claimed in claim 14 further comprising the step of obtaining said first, second and third frequency estimates of the single carrier signal by:
   obtaining a coarse frequency estimate of said single carrier signal by locating a pilot carrier signal on an average power spectrum of said single carrier signal; and
   obtaining a fine frequency estimate of said single carrier signal using a frequency error $\Delta f_p$ where $\Delta f_p$ is given by the equation:

$$\Delta f_p [1/(2\pi N T_s)][\text{Arg}[X_{pr,q}(0)/X_{pr,q+1}(0)]]$$

where $[1/(NT_s)]$ is a frequency spacing, and where $T_s$ is a sampling period, and where $X_{pr}(0)$ is the transmitted signal with constant frequency error in a zeroth bin, and where $\text{Arg}[X_{pr,q+1}(0)/X_{pr,q+1}(0)]$ is a phase of a pilot carrier signal in the zeroth bin.

17. The method as claimed in claim 16 wherein a synchronization circuit capable of obtaining the coarse and fine frequency estimates has a linear transfer function.

18. A method for providing frequency domain synchronization for a single carrier signal, comprising the steps of:
   generating a time domain DC estimate in a DC estimator circuit; and
   providing said time domain DC estimate to a fine frequency estimate and phase estimate circuit;
   wherein said time domain DC estimate is provided to said fine frequency estimate and phase estimate circuit by switching an input of said fine frequency estimate and phase estimate circuit from an output of a Fast Fourier Transformer to an output of said DC estimator circuit.

19. A method for providing frequency domain synchronization for a single carrier signal, comprising the steps of:
   generating a time domain DC estimate in a DC estimator circuit; and
   providing said time domain DC estimate to a fine frequency estimate and phase estimate circuit;
   wherein the step of generating said time domain DC estimate in said DC estimator circuit comprises the step of calculating said time domain DC estimate, $DC_{NEW}$, from the equation:

$$DC_{NEW} = FFT(0) - \text{Input}(N) + \text{Input}(0)$$

where $FFT(0)$ is a processed DC estimate, and where Input$(N)$ is an input sample received N time periods earlier, and where Input$(0)$ is a current input sample.

20. The method as claimed in claim 19 further comprising the steps of:
   providing the value of Input(N) to said DC estimator circuit from an output of a circular input buffer for a Fast Fourier Transformer;
   providing the value of Input(0) to said DC estimator circuit from an output of a sample rate converter; and
   providing the value of FFT(0) from an output of an adder that adds the outputs of a coarse frequency estimate circuit and said fine frequency estimate and phase estimate circuit.

* * * * *